United States Patent
Lin et al.

(10) Patent No.: US 10,056,962 B2
(45) Date of Patent: Aug. 21, 2018

(54) METHOD FOR REDUCING ADJACENT-CHANNEL INTERFERENCE AND RELAY DEVICE

(71) Applicant: Huawei Technologies Co., Ltd., Shenzhen, Guangdong (CN)

(72) Inventors: Huajiong Lin, Chengdu (CN); Weimin Chen, Chengdu (CN); Zhengzheng Li, Chengdu (CN); Qing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 15/248,388

(22) Filed: Aug. 26, 2016

(65) Prior Publication Data

US 2016/0365914 A1    Dec. 15, 2016

Related U.S. Application Data

(63) Continuation of application No. PCT/CN2014/095503, filed on Dec. 30, 2014.

(30) Foreign Application Priority Data

Feb. 27, 2014   (CN) .......................... 2014 1 0069032

(51) Int. Cl.
| | |
|---|---|
| H04W 4/00 | (2018.01) |
| H04B 7/14 | (2006.01) |
| H04B 1/525 | (2015.01) |
| H04B 15/00 | (2006.01) |

(52) U.S. Cl.
CPC ............... *H04B 7/14* (2013.01); *H04B 1/525* (2013.01); *H04B 15/00* (2013.01)

(58) Field of Classification Search
USPC .......................... 370/329, 278, 252, 280, 277
See application file for complete search history.

(56) References Cited

U.S. PATENT DOCUMENTS

| | | | |
|---|---|---|---|
| 2003/0031279 A1 | 2/2003 | Blount et al. | |
| 2011/0170473 A1 | 7/2011 | Proctor, Jr. et al. | |
| 2015/0156004 A1* | 6/2015 | Khandani | ............. H04L 5/1423 370/278 |

FOREIGN PATENT DOCUMENTS

| | | |
|---|---|---|
| CN | 101420246 A | 4/2009 |
| CN | 101453228 A | 6/2009 |
| CN | 101777874 A | 7/2010 |
| CN | 102237906 A | 11/2011 |

(Continued)

*Primary Examiner* — Zewdu A Beyen

(57) ABSTRACT

A method for reducing adjacent-channel interference includes: obtaining, by a receiver, a first analog signal from a radio frequency front-end of a transmitter, where the first analog signal is a signal transmitted by the transmitter to the outside, and the signal transmitted by the transmitter to the outside forms a self-interference signal at an antenna of the receiver; performing analog-to-digital conversion on the first analog signal so as to obtain a first digital signal; receiving, by the receiver, a second analog signal, where the second analog signal includes a wanted signal and the self-interference signal; performing analog-to-digital conversion on the second analog signal so as to obtain a second digital signal; and performing digital cancellation on the second digital signal and the first digital signal so as to obtain a wanted digital signal of the second digital signal.

8 Claims, 7 Drawing Sheets

(56) References Cited

FOREIGN PATENT DOCUMENTS

| CN | 102355296 | A | 2/2012 |
|----|-----------|---|--------|
| CN | 102594463 | A | 7/2012 |
| CN | 103218644 | A | 7/2013 |
| CN | 103595520 | A | 2/2014 |
| EP | 1876734 | A1 | 1/2008 |
| WO | 2010/056166 | A1 | 5/2010 |

* cited by examiner

US 10,056,962 B2

METHOD FOR REDUCING ADJACENT-CHANNEL INTERFERENCE AND RELAY DEVICE

CROSS-REFERENCE TO RELATED APPLICATIONS

This application is a continuation of International Application No. PCT/CN2014/095503, filed on Dec. 30, 2014, which claims priority to Chinese Patent Application No. 201410069032.7, filed on Feb. 27, 2014, both of which are hereby incorporated by reference in their entireties.

TECHNICAL FIELD

The present invention relates to the field of communications technologies, and in particular, to a method for reducing adjacent-channel interference and a relay device.

BACKGROUND

In a mobile communications network, a wireless relay technology is mainly used for hotspot coverage, cell expansion, emergency, a in-vehicle scenario, and cell coverage enhancement. As shown in FIG. 1, in the mobile communications network, a wireless relay device 101 may be classified into two parts. One part is configured to communicate with a macro base station, where the macro base station is an evolved NodeB (eNB) 102, and this part is referred to as R-UE104. The other part is configured to communicate with user equipment (UE) 103, and the other part is referred to as an R-eNB105. An interface between the eNB and the relay device is a backhaul link, and an interface between the relay device and the UE is an access link. In a practical application, frequencies are configured for the backhaul link and the access link according to a requirement. However, when adjacent frequency bands are configured for the backhaul link and the access link, adjacent-channel interference may be caused in relay transmitting and receiving.

As shown in FIG. 2, 60 MHz spectrum resources are available, and 20 MHz is used as one frequency band to divide the available spectrum resources into three frequency bands, which are successively f1, f2, and f3. As shown in FIG. 1, a backhaul link uses a frequency band fb, and a access link uses a frequency band fa. When the frequency band fb is the f1, and the frequency band fa is the f2, the backhaul link and the access link use adjacent frequency bands, and adjacent-channel interference may be caused between an R-UE antenna and an R-eNB antenna. For example, when the R-UE104 receives downlink data transmitted by the eNB102, the R-UE104 is interfered by a signal transmitted by the R-eNB105 to the UE103. As a result, the R-UE104 is unable to normally receive a signal transmitted by the eNB102.

Adjacent-channel interference mainly includes two types: spurious interference and blocking interference. The spurious interference refers to additive interference generated by an interference source in an operating frequency band of an interfered receiver, including out-of-band power leakage, a transmit intermodulation product, transmission background noise, and the like of the interference source, and the additive interference may deteriorate a signal-to-noise ratio of the interfered receiver. The blocking interference refers to a strong interference signal out of the operating frequency band of the interfered receiver, and the strong interference signal may lead to receiver saturation, cause a gain decrease, generate interference in an intermediate frequency after being mixed with a local-frequency signal, and directly cause interference because of limited out-of-band suppression. Generally, the receiver works in a linear range. When a strong interference signal enters the receiver, the receiver is to work in a nonlinear state, and the receiver saturation is even caused.

In order to avoid interference between transmit and receive antennas of the R-UE and the R-eNB, definite isolation is required between a receiver Rx and a transmitter Tx. For example, when a guard interval between the frequency band fa and the frequency band fb is 0 MHz, the isolation between the Rx and the Tx is required to be 111 dB. When the guard interval between the frequency band fa and the frequency band fb is 5 MHz, the isolation between the Rx and the Tx is required to be 103 dB; in this case, if the frequency band fa occupies the frequency band f1 in FIG. 2, the guard interval occupies 5 MHz bandwidth of the frequency band f2, and the frequency band fb can only occupy part of bandwidth of the frequency band f2. When the guard interval between the frequency band fa and the frequency band fb is 20 MHz, the isolation between the Rx and the Tx is required to be 84 dB; in this case, the frequency band fa may occupy the frequency band f1 in FIG. 2, the guard interval occupies the frequency band f2, and the frequency band fb occupies the frequency band f3.

To meet a requirement for isolation between the transmit and receive antennas, two technical solutions are mainly used currently. For details, refer to Table 1.

TABLE 1

| Guard interval between the backhaul link and the access link | 0 MHz | 5 MHz | 20 MHz |
|---|---|---|---|
| Solution 1: physical isolation | The Rx and the Tx are placed back to back; a requirement for a distance between the transmit and receive antennas is: 1.5 m horizontal spacing; and 1 m vertical spacing. | The Rx and the Tx are placed back to back; a requirement for a distance between the transmit and receive antennas is: 1.4 m horizontal spacing; and 1 m vertical spacing. | The Rx and the Tx are placed back to back; a requirement for a distance between the transmit and receive antennas is: 0.8 m horizontal spacing; and 0.8 m vertical spacing. |
| Solution 2: physical isolation with a filter added | The filter is added. The Rx and the Tx are placed back to back; a requirement for a distance between the transmit and receive antennas is: 1.4 m horizontal spacing; and 1 m vertical spacing. | The filter is added. The Rx and the Tx are placed back to back; a requirement for a distance between the transmit and receive antennas is: 0.5 m horizontal spacing; and 0.5 m vertical spacing. | The filter is added. The Rx and the Tx are placed back to back; a requirement for a distance between the transmit and receive antennas is: 0.5 m horizontal spacing; and 0.5 m vertical spacing. |

In the solution 1, a physical isolation method is used to adjust placing positions of the Rx and the Tx to keep a large enough distance between the Rx and the Tx, so as to reduce the interference between the transmit and receive antennas. However, this method requires a large distance between the transmit and receive antennas on the relay device, which brings difficulty to installation of the relay device, and is unfavorable to product integration of the relay device. In the solution 2, the filter is added between the Rx and the Tx based on the physical isolation, so as to further reduce the interference between the transmit and receive antennas. Compared with the solution 1, the solution 2 relatively lowers a requirement for spacing between the Rx and the Tx, but still has a relatively high requirement for the spacing. In addition, because the filter needs to be added, a volume of the relay device is enlarged, and a cost of the relay device is increased. Moreover, when the volume of the device is required to be less than or equal to 0.5 $m^3$, the backhaul link and the access link need to be isolated by at least 5 MHz, and consequently adjacent frequency bands cannot be configured for the backhaul link and the access link. Therefore, configuration flexibility of the backhaul link and the access link is limited.

SUMMARY

The present invention provides a method for reducing adjacent-channel interference and a relay device, where adjacent-channel interference from signal transmitting to signal receiving is reduced in a signal processing manner.

A first aspect of the present invention provides a relay device, including a transmitter and a receiver, where the transmitter includes a first radio frequency front-end module, and the receiver includes a second radio frequency front-end module, a receive channel module, a feedback channel module, and a digital cancellation module, where the first radio frequency front-end module is connected to the feedback channel module of the receiver, and is configured to transmit a first analog signal to the feedback channel module, where the first analog signal is a signal transmitted by the transmitter to the outside, and the signal transmitted by the transmitter to the outside forms a self-interference signal at an antenna of the receiver;

the second radio frequency front-end module is configured to receive a second analog signal, where the second analog signal includes a wanted signal and the self-interference signal, and transmit the second analog signal to the receive channel module;

the receive channel module is connected to the second radio frequency front-end module, and is configured to receive the second analog signal transmitted by the second radio frequency front-end module, perform analog-to-digital conversion on the second analog signal so as to obtain a second digital signal, and transmit the second digital signal to the digital cancellation module, where the second digital signal includes a wanted signal component and a self-interference signal component;

the feedback channel module is connected to the first radio frequency front-end module, and is configured to receive the first analog signal transmitted by the first radio frequency front-end module, perform preprocessing and analog-to-digital conversion on the first analog signal so as to obtain a first digital signal, and transmit the first digital signal to the digital cancellation module; and the digital cancellation module is separately connected to the receive channel module and the feedback channel module, and is configured to receive the second digital signal transmitted by the receive channel module and the first digital signal transmitted by the feedback channel module, and perform digital cancellation on the second digital signal and the first digital signal so as to eliminate a self-interference component of the second digital signal.

With reference to the first aspect of the present invention, in a first possible implementation manner of the first aspect, the digital cancellation module is specifically configured to: perform digital interference reconstruction according to the first digital signal so as to obtain a self-interference digital cancellation signal, and combine the self-interference digital cancellation signal with the second digital signal.

With reference to the first aspect of the present invention or the first possible implementation manner of the first aspect, in a second possible implementation manner of the first aspect, the digital cancellation module is further configured to perform digital filtering on the first digital signal after receiving the first digital signal transmitted by the receive channel module, so as to obtain a first digital signal after the digital filtering; the digital cancellation module is specifically configured to perform digital cancellation on the second digital signal and the first digital signal obtained after the digital filtering.

With reference to the first aspect of the present invention or the first or the second possible implementation manner of the first aspect, in a third possible implementation manner of the first aspect, the first radio frequency front-end module is further connected to the second radio frequency front-end module, and is configured to send the first analog signal to the second radio frequency front-end module;

the second radio frequency front-end module further includes:

a receiving submodule, configured to receive the second analog signal, and transmit the second analog signal to an analog cancellation submodule;

a reconstruction submodule, connected to the first radio frequency front-end module, and configured to receive the first analog signal sent by the first radio frequency front-end module, perform analog interference reconstruction according to the first analog signal so as to obtain a self-interference analog cancellation signal, and transmit the self-interference analog cancellation signal to the analog cancellation submodule; and the analog cancellation submodule, separately connected to the receiving submodule and the reconstruction submodule, and configured to receive the second analog signal transmitted by the receiving submodule, receive the self-interference analog cancellation signal transmitted by the reconstruction submodule, and perform analog cancellation on the second analog signal and the self-interference analog cancellation signal so as to obtain a second analog signal after the analog cancellation; and transmit the second analog signal obtained after the analog cancellation to the receive channel module; where the receive channel module is connected to the analog cancellation submodule, and is configured to receive the second analog signal that is obtained after the analog cancellation and sent by the analog cancellation submodule, and perform analog-to-digital conversion on the second analog signal obtained after the analog cancellation, so as to obtain the second digital signal.

With reference to the first aspect of the present invention or the first or the second possible implementation manner of the first aspect, in a fourth possible implementation manner of the first aspect, the second radio frequency front-end module is configured to receive the second analog signal in a superheterodyne manner.

A second aspect of the present invention provides a method for reducing adjacent-channel interference, including: obtaining, by a receiver, a first analog signal from a radio frequency front-end of a transmitter, where the receiver and the transmitter are included in a relay device, the first analog signal is a signal transmitted by the transmitter to the outside, and the signal transmitted by the transmitter to the outside forms a self-interference signal at an antenna of the receiver;

performing preprocessing and analog-to-digital conversion on the first analog signal so as to obtain a first digital signal;

receiving, by the receiver, a second analog signal, where the second analog signal includes a wanted signal and the self-interference signal;

performing analog-to-digital conversion on the second analog signal so as to obtain a second digital signal, where the second digital signal includes a wanted signal component and a self-interference signal component; and performing digital cancellation on the second digital signal and the first digital signal so as to eliminate a self-interference component of the second digital signal.

With reference to the second aspect of the present invention, in a first possible implementation manner of the second aspect, the performing digital cancellation on the second digital signal and the first digital signal includes:

performing digital interference reconstruction according to the first digital signal so as to obtain a self-interference digital cancellation signal, and combining the self-interference digital cancellation signal with the second digital signal.

With reference to the second aspect of the present invention or the first possible implementation manner of the second aspect, in a second possible implementation manner of the second aspect, digital filtering is performed on the first digital signal so as to obtain a first digital signal after the digital filtering; and the performing digital cancellation on the second digital signal and the first digital signal includes:

performing digital cancellation on the second digital signal and the first digital signal obtained after the digital filtering.

With reference to the second aspect of the present invention or the first or the second possible implementation manner of the second aspect, in a third possible implementation manner of the second aspect, after the obtaining, by a receiver, a first analog signal from a radio frequency front-end of a transmitter, the method further includes:

performing analog interference reconstruction according to the first analog signal so as to obtain a self-interference analog cancellation signal; and performing analog cancellation on the second analog signal and the self-interference analog cancellation signal so as to obtain a second analog signal after the analog cancellation; and the performing analog-to-digital conversion on the second analog signal so as to obtain a second digital signal includes:

performing analog-to-digital conversion on the second analog signal obtained after the analog cancellation, so as to obtain the second digital signal.

With reference to the second aspect of the present invention or the first or the second possible implementation manner of the second aspect, in a fourth possible implementation manner of the second aspect, the receiving, by the receiver, a second analog signal includes:

receiving, by the receiver, the second analog signal in a superheterodyne manner, where the receiver is a superheterodyne receiver.

In the method for reducing adjacent-channel interference provided in the embodiments of the present invention, spurious interference in a second digital signal may be reduced by performing digital cancellation on the second digital signal and a first digital signal, so as to obtain a wanted digital signal. Therefore, this is a signal processing manner used to reduce adjacent-channel interference from signal transmitting to signal receiving, so that a distance between transmit and receive antennas may be shortened, thereby reducing installation difficulty of a relay device and reducing a volume of the relay device.

BRIEF DESCRIPTION OF THE DRAWINGS

To describe the technical solutions in the embodiments of the present invention more clearly, the following briefly describes the accompanying drawings required for describing the prior art and the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and detailedly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the technical solutions in the present invention more comprehensible, the following describes the embodiments of the present invention in detail with reference to the accompanying drawings.

Figure 1:
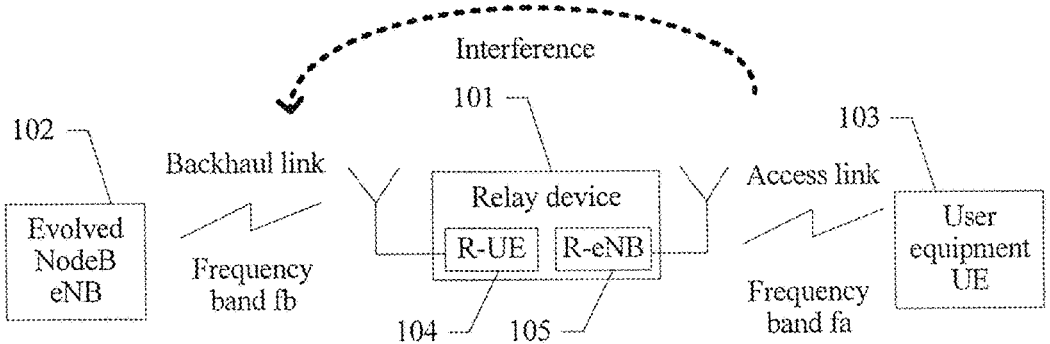
FIG. 1 is a schematic diagram of receiving a signal by a relay device in the prior art.
Figure 2:
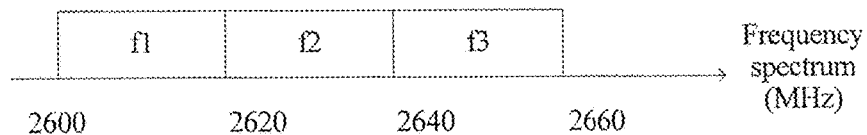
FIG. 2 is a schematic diagram of frequency band division in the prior art.
Figure 3:
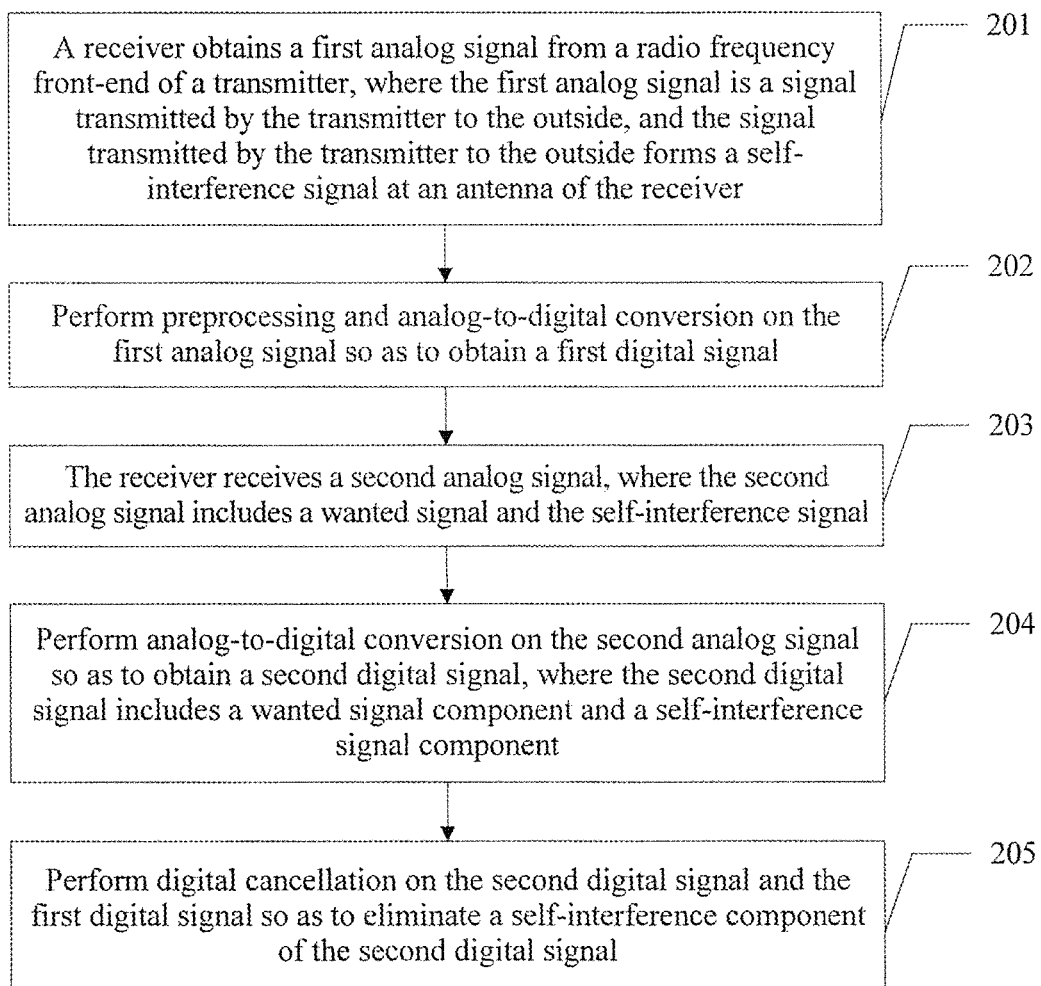
FIG. 3 is a flowchart of a method for reducing adjacent-channel interference according to an embodiment of the present invention.

FIG. 3 is a flowchart of a method for reducing adjacent-channel interference according to an embodiment of the present invention. Referring to FIG. 3, the method includes:

201. A receiver obtains a first analog signal from a radio frequency front-end of a transmitter, where the first analog signal is a signal transmitted by the transmitter to the outside, and the signal transmitted by the transmitter to the outside forms a self-interference signal at an antenna of the receiver.

For example, a relay device includes a receiver and a transmitter. When the receiver receives a signal sent by a base station, the transmitter transmits a signal to a terminal, and the signal transmitted by the transmitter to the terminal forms a self-interference signal at an antenna of the receiver, which causes interference to receiving, by the receiver, the signal sent by the base station. In step 201, when the transmitter transmits a signal to the outside, the receiver may directly obtain, by coupling, the first analog signal from the radio frequency front-end of the transmitter. The first analog signal is the signal transmitted by the transmitter to the outside, which may be understood as that the first analog signal and the signal transmitted by the transmitter to the outside are the same in a form but different in strength, and in other words, may also be understood as that the first analog signal is a part of the signal obtained by coupling from the signal transmitted by the transmitter to the outside.

202. Perform preprocessing and analog-to-digital conversion on the first analog signal so as to obtain a first digital signal.

203. The receiver receives a second analog signal, where the second analog signal includes a wanted signal and the self-interference signal.

In the relay device, because frequency bands used by the receiver and the transmitter are close and an installation distance is relatively short, when the transmitter transmits the signal, adjacent-channel interference to signal receiving of the receiver is likely to occur. The adjacent-channel interference is from the relay device itself, and may also be referred to as the self-interference signal. The second analog signal is exactly a signal received by the receiver, where a wanted signal of the signal is a wanted signal that the receiver needs to obtain, for example, the signal sent by the base station. However, because of interference from the self-interference signal, interference elimination processing needs to be performed on the received signal.

204. Perform analog-to-digital conversion on the second analog signal so as to obtain a second digital signal, where the second digital signal includes a wanted signal component and a self-interference signal component.

205. Perform digital cancellation on the second digital signal and the first digital signal so as to eliminate a self-interference component of the second digital signal.

In the used method for reducing adjacent-channel interference provided in this embodiment of the present invention, a self-interference component of a second digital signal may be eliminated by performing digital cancellation on the second digital signal and a first digital signal, so as to obtain a wanted digital signal. Therefore, this is a signal processing manner used to reduce adjacent-channel interference from signal transmitting to signal receiving, there is no requirement for a distance between transmit and receive antennas, and the distance between the transmit and receive antennas may even be shortened, thereby reducing installation difficulty of a relay device and reducing a volume of the relay device.

With reference to a relay device, the following gives a detailed description of the foregoing method for reducing adjacent-channel interference.

Figure 4:
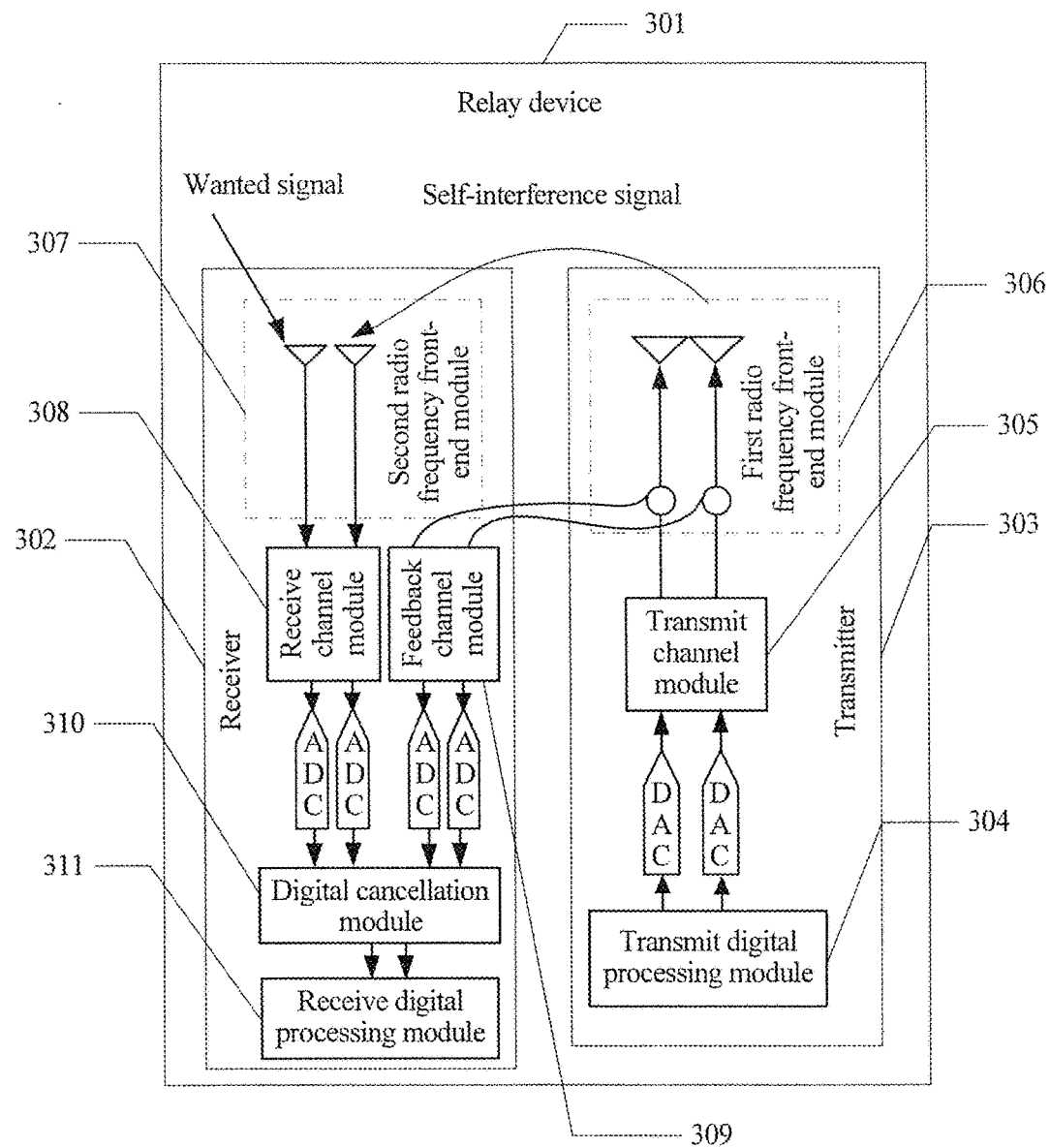
FIG. 4 is a schematic structural diagram of a relay device according to an embodiment of the present invention.

Referring to FIG. 4, FIG. 4 is a schematic structural diagram of a relay device. A relay device 301 in FIG. 4 includes a receiver 302 and a transmitter 303. The transmitter 303 includes a first radio frequency front-end module 306, a transmit channel module 305 (including digital-to-analog conversion DAC), and a transmit digital processing module 304. The transmit digital processing module 304 outputs, to a digital-to-analog conversion module, a digital signal to be transmitted by the transmitter 303, where the digital-to-analog conversion module converts the digital signal to an analog signal, and outputs the analog signal to the first radio frequency front-end module 306 by using the transmit channel module 305, and the first radio frequency front-end module 306 transmits the analog signal by using an antenna on the first radio frequency front-end module 306. The receiver 302 includes a second radio frequency front-end module 307, a receive channel module 308 (including an analog-to-digital conversion ADC module), a feedback channel module 309 (also including an ADC module), a digital cancellation module 310, and a receive digital processing module 311. The second radio frequency front-end module 307 receives a signal by using an antenna on the second radio frequency front-end module 307, where the received signal includes a wanted signal and a self-interference signal. The wanted signal is a signal used to carry information, and is generally a wireless signal transmitted by a remote device (such as a base station or user equipment). On one hand, the feedback channel module 309 is connected to the first radio frequency front-end module 306 of the transmitter 303, obtains, by coupling from the first radio frequency front-end module 306, an analog signal transmitted by the transmitter 303, and performs preprocessing on the analog signal, where steps of the preprocessing include filtering, gain adjustment, and a frequency mixing operation. The feedback channel module 309 may include a filter, a gain controller, and a mixer. In a process of the preprocessing performed on the analog signal by the feedback channel module 309, the filter may perform filtering on the analog signal, the gain controller may perform gain adjustment on the analog signal, and the mixer may perform frequency mixing on the analog signal. The feedback channel module 309 performs analog-to-digital conversion on a preprocessed analog signal so as to form a first digital signal. On the other hand, the second radio frequency front-end module 307 transmits the received signal to the receive channel module 308, and the receive channel module 308 performs analog-to-digital conversion on the received signal so as to form a second digital signal. After being formed, the first digital signal and the second digital signal are transmitted to the digital cancellation module 310. The digital cancellation module 310 is configured to perform digital cancellation on the second digital signal and the first digital signal so as to eliminate a self-interference component of the second digital signal. Then, the digital cancellation module 310 transmits a wanted digital signal to the receive digital processing module 311 for further processing.

Optionally, the digital cancellation module 310 is specifically configured to: perform digital interference reconstruction according to the first digital signal so as to obtain a self-interference digital cancellation signal, combine the self-interference digital cancellation signal with the second digital signal, and complete digital cancellation so as to eliminate a self-interference signal component of the second digital signal, thereby obtaining a wanted signal component. The digital interference reconstruction may be implemented in a training manner or an adaptive manner. For example, in a process of the digital interference reconstruction, the self-interference digital cancellation signal may be obtained by performing amplitude modulation, frequency translation, and phase modulation processing on the first digital signal, so that the self-interference digital cancellation signal and the self-interference signal component of the second digital signal have a same amplitude and frequency and opposite phases (that is, a phase difference is 180 degrees). Therefore, cancellation can be performed on the self-interference digital cancellation signal and the self-interference signal component of the second digital signal.

Optionally, the digital cancellation module 310 may be further configured to: perform digital filtering on the first digital signal so as to obtain a first digital signal after the digital filtering, combine the first digital signal obtained after the digital filtering with the second digital signal, and complete digital cancellation. An interference frequency component out of a frequency of a wanted signal may be further filtered by performing the digital filtering on the first digital signal.

In this embodiment, the receiver 302 may be a superheterodyne receiver, may receive the second analog signal in a superheterodyne manner when receiving the second analog signal, and performs intermediate frequency filtering on the signal received by the receiver 302, so as to eliminate blocking interference caused by a signal transmitted by the transmitter 303 to the signal received by the receiver 302.

Figure 5:
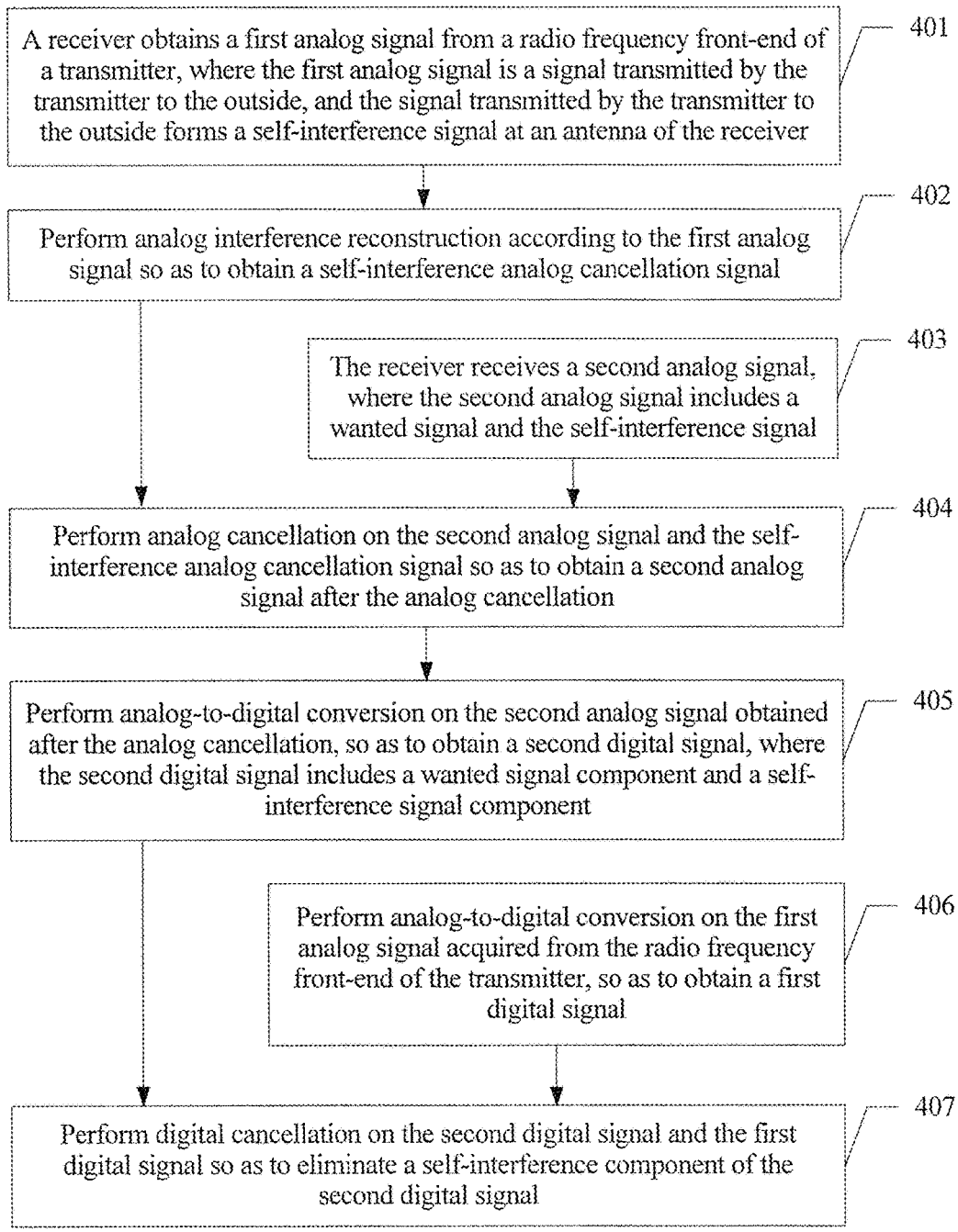
FIG. 5 is a flowchart of a method for reducing adjacent-channel interference according to an embodiment of the present invention.

Based on the foregoing embodiment, an embodiment of the present invention further describes analog cancellation, and provides a flowchart of another method for reducing adjacent-channel interference. Referring to FIG. 5, the method includes:

401. A receiver obtains a first analog signal from a radio frequency front-end of a transmitter, where the first analog signal is a signal transmitted by the transmitter to the outside, and the signal transmitted by the transmitter to the outside forms a self-interference signal at an antenna of the receiver.

402. Perform analog interference reconstruction according to the first analog signal so as to obtain a self-interference analog cancellation signal.

For example, performing the analog interference reconstruction on the first analog signal may be: performing one or more operations of delay adjustment, phase adjustment, or amplitude adjustment on the first analog signal according to a signal parameter changed by interference caused by the transmitter to the receiver, for example, one or more signal parameters of a delay, a phase, or an amplitude, so as to obtain the self-interference analog cancellation signal.

403. The receiver receives a second analog signal, where the second analog signal includes a wanted signal and the self-interference signal.

404. Perform analog cancellation on the second analog signal and the self-interference analog cancellation signal so as to obtain a second analog signal after the analog cancellation.

The self-interference analog cancellation signal and the self-interference signal included in the second analog signal have a same amplitude and frequency and opposite phases (that is, a phase difference is 180 degrees). Therefore, analog cancellation can be performed on the self-interference analog cancellation signal and the self-interference signal included in the second analog signal.

405. Perform analog-to-digital conversion on the second analog signal obtained after the analog cancellation, so as to obtain a second digital signal, where the second digital signal includes a wanted signal component and a self-interference signal component.

406. Perform analog-to-digital conversion on the first analog signal obtained from the radio frequency front-end of the transmitter, so as to obtain a first digital signal.

In step 406, before the analog-to-digital conversion is performed on the first analog signal, the first analog signal may be preprocessed, where preprocessing operations include filtering, gain adjustment, and a frequency mixing operation.

407. Perform digital cancellation on the second digital signal and the first digital signal so as to eliminate a self-interference component of the second digital signal.

A principle of performing a digital cancellation process in step 407 is the same as that of the digital cancellation in the embodiments shown in FIG. 3 and FIG. 4. For a specific implementation manner, refer to the foregoing embodiments, and the details are not described herein.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In this embodiment of the present invention, a self-interference signal of a second analog signal may first be partially eliminated by means of analog cancellation, that is, blocking interference and spurious interference from the self-interference signal to a wanted signal are reduced. Then, digital cancellation is further performed to further eliminate a self-interference component of a digital signal, so as to achieve a better effect of adjacent-channel interference elimination.

With reference to a relay device, the following further gives a detailed description of the embodiment of the present invention.

Figure 6:
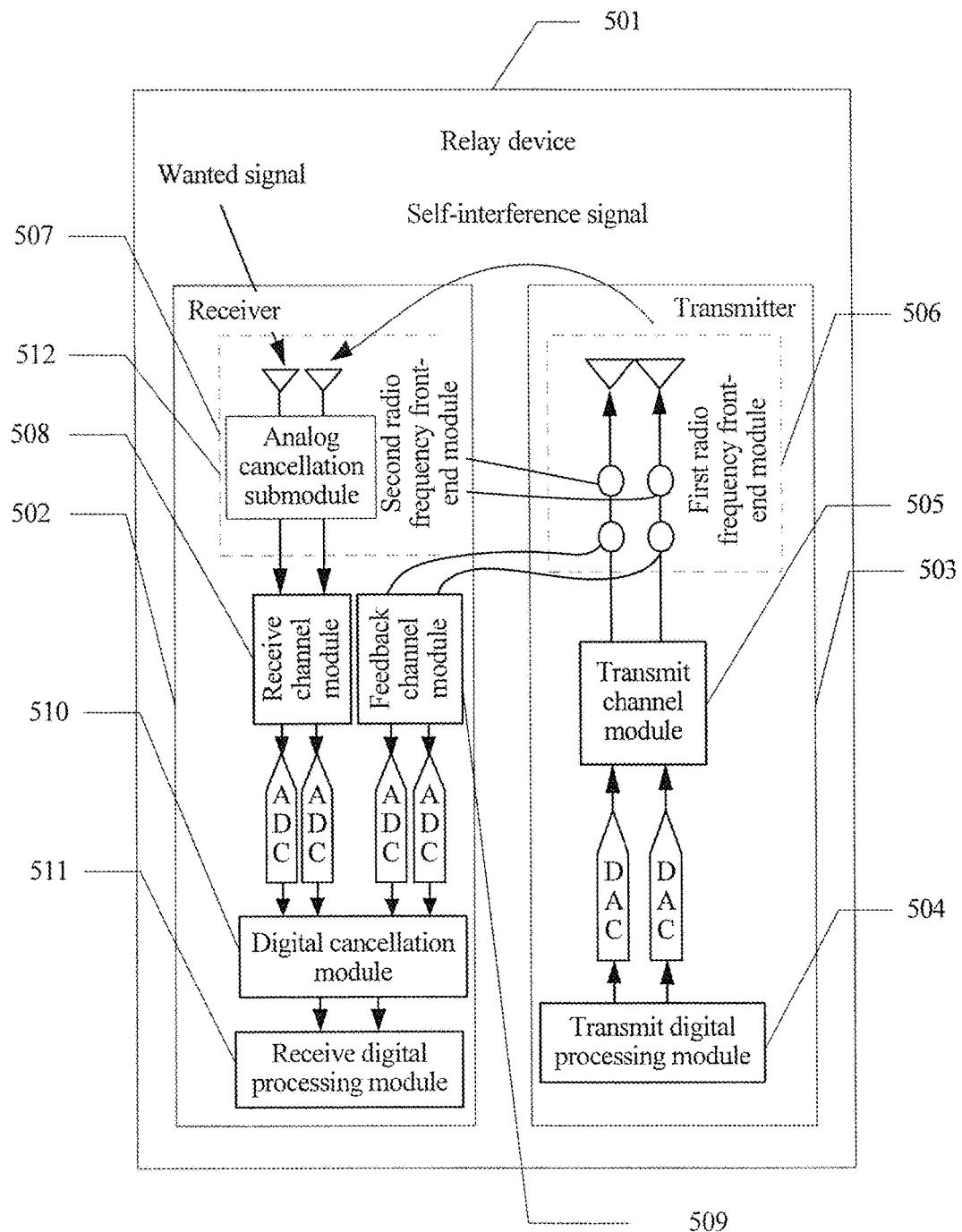
FIG. 6 is another schematic structural diagram of a relay device according to an embodiment of the present invention.

Referring to FIG. 6, FIG. 6 is a schematic structural diagram of a relay device. A relay device 501 in FIG. 6 includes a receiver 502 and a transmitter 503. The transmitter 503 includes a first radio frequency front-end module 506, a transmit channel module 505 (including a digital-to-analog conversion DAC module), and a transmit digital processing module 504. The transmit digital processing module 504 outputs, to the digital-to-analog conversion module, a digital signal to be transmitted by the transmitter 503, where the digital-to-analog conversion module converts the digital signal to an analog signal, and outputs the analog signal to the first radio frequency front-end module 506 by using the transmit channel module 505, and the first radio frequency front-end module 506 transmits the analog signal by using an antenna on the first radio frequency front-end module 506. The receiver 502 includes a second radio frequency front-end module 507, a receive channel module 508 (including an analog-to-digital conversion ADC module), a feedback channel module 509 (also including an ADC module), a digital cancellation module 510, and a receive digital processing module 511. The second radio frequency front-end module 507 includes an analog cancellation submodule 512. The second radio frequency front-end module 507 and the feedback channel module 509 are separately connected to the first radio frequency front-end module 506, and separately obtain, by coupling from the first radio frequency front-end module 506, the analog signal transmitted by the first radio frequency front-end module 506. The second radio frequency front-end module 507 receives a signal by using an antenna on the second radio frequency front-end module 507, where the received signal includes a wanted signal and a self-interference signal, and the wanted signal is interfered by the self-interference signal. The second radio frequency front-end module 507 performs analog interference reconstruction on the analog signal obtained by coupling from the first radio frequency front-end module 506, so as to obtain a self-interference analog cancellation signal. The analog cancellation submodule 512 performs analog cancellation on the signal received by the second radio frequency front-end module 507 and the self-interference analog cancellation signal, so as to reduce blocking interference and part of spurious interference in the received signal, and transmits the received signal to the receive channel module 508 after the analog cancellation. The second radio frequency front-end module 507 transmits the received signal to the receive channel module 508. The receive channel module 508 performs analog-to-digital conversion on the received signal so as to form a second digital signal, where the second digital signal includes a wanted signal component and a self-interference signal component. On the other hand, the feedback channel module 509 obtains, by coupling from the first radio frequency front-end module 506, an analog signal transmitted by the transmitter 503, performs preprocessing on the analog signal, where steps of the preprocessing include filtering, gain adjustment, and a frequency mixing operation, and performs analog-to-digital conversion on a preprocessed analog signal so as to form a first digital signal. After the first digital signal and the second digital signal are formed, the feedback channel module 509 transmits the first digital signal to the digital cancellation module 510, and the receive channel module 508 transmits the second digital signal to the digital cancellation module 510. The digital cancellation module 510 is configured to perform digital cancellation on the second digital signal and the first digital signal so as to eliminate a self-interference component of the second digital signal. Then, the digital cancellation module 510 transmits a wanted digital signal to the receive digital processing module 511 for further processing.

Optionally, the digital cancellation module 510 is specifically configured to: perform digital interference reconstruction according to the first digital signal so as to obtain a self-interference digital cancellation signal, combine the self-interference digital cancellation signal with the second digital signal, and complete digital cancellation so as to eliminate the self-interference signal component of the second digital signal, thereby obtaining the wanted signal component. The digital interference reconstruction may be implemented in a training manner or an adaptive manner. For example, in a process of the digital interference reconstruction, the self-interference digital cancellation signal may be obtained by performing amplitude modulation, frequency translation, and phase modulation processing on the first digital signal, so that the self-interference digital cancellation signal and the self-interference signal component of the second digital signal have a same amplitude and frequency and opposite phases (that is, a phase difference is 180 degrees). Therefore, cancellation can be performed on the self-interference digital cancellation signal and the self-interference signal component of the second digital signal.

Optionally, the digital cancellation module 510 may be further configured to: perform digital filtering on the first digital signal so as to obtain a first digital signal after the digital filtering, combine the first digital signal obtained after the digital filtering with the second digital signal, and complete digital cancellation. An interference frequency component out of a frequency of a wanted signal may be further filtered by performing the digital filtering on the first digital signal.

Figure 7:
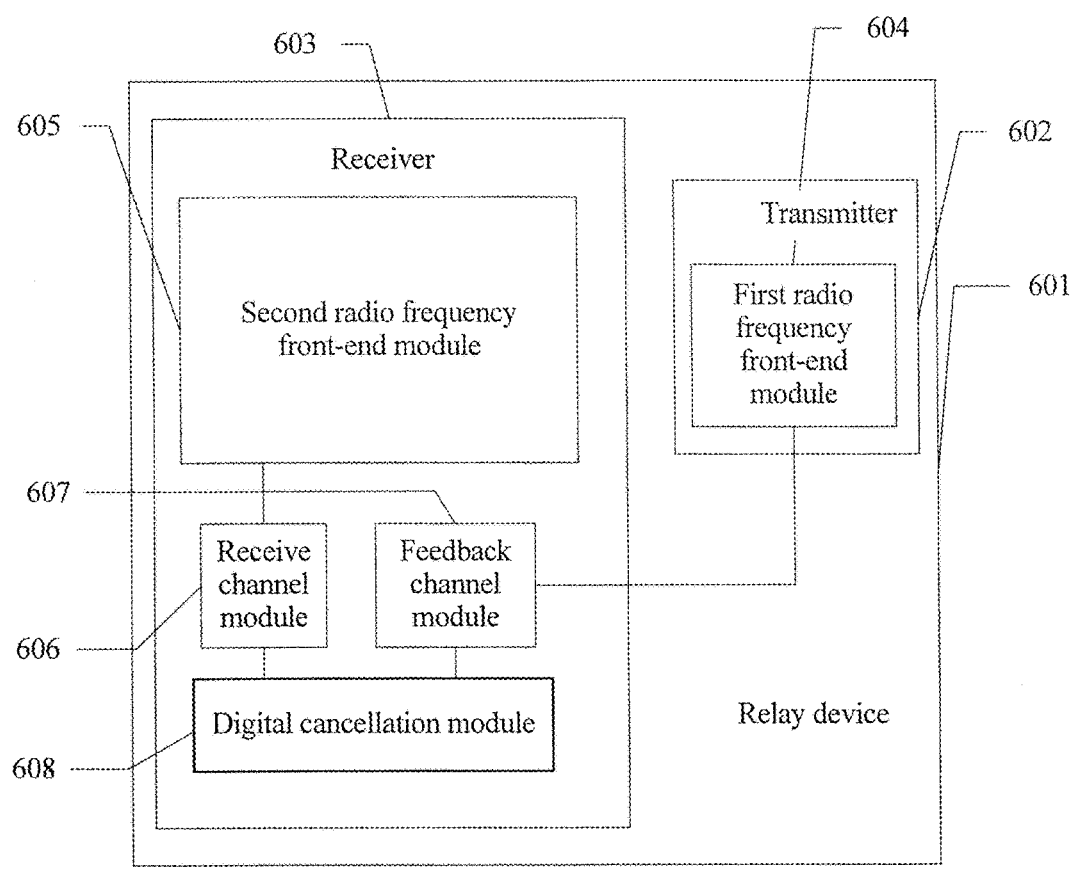
FIG. 7 is a schematic structural diagram of a relay device according to an embodiment of the present invention.

As shown in FIG. 7, an embodiment of the present invention further provides a relay device 601, including a transmitter 602 and a receiver 603.

The transmitter 602 includes:
a first radio frequency front-end module 604, connected to a feedback channel module 607 of the receiver 603, and configured to transmit a first analog signal to the feedback channel module 607, where the first analog signal is a signal transmitted by the transmitter 602 to the outside, and the signal transmitted by the transmitter 602 to the outside forms a self-interference signal at an antenna of the receiver 603.

The receiver 603 includes:
a second radio frequency front-end module 605, configured to receive a second analog signal, where the second analog signal includes a wanted signal and the self-interference signal, and transmit the second analog signal to a receive channel module 606;

the receive channel module 606, connected to the second radio frequency front-end module 605, and configured to receive the second analog signal transmitted by the second radio frequency front-end module 605, perform analog-to-digital conversion on the second analog signal so as to obtain a second digital signal, and transmit the second digital signal to a digital cancellation module 608, where the second digital signal includes a wanted signal component and a self-interference signal component;

the feedback channel module 607, connected to the first radio frequency front-end module 604, and configured to receive the first analog signal transmitted by the first radio frequency front-end module 604, perform analog-to-digital conversion on the first analog signal so as to obtain a first digital signal, and transmit the first digital signal to the digital cancellation module 608; and the digital cancellation module 608, separately connected to the receive channel module 606 and the feedback channel module 607, and configured to receive the second digital signal transmitted by the receive channel module 606 and the first digital signal transmitted by the feedback channel module 607, and perform digital cancellation on the second digital signal and the first digital signal so as to eliminate a self-interference component of the second digital signal.

Figure 8:
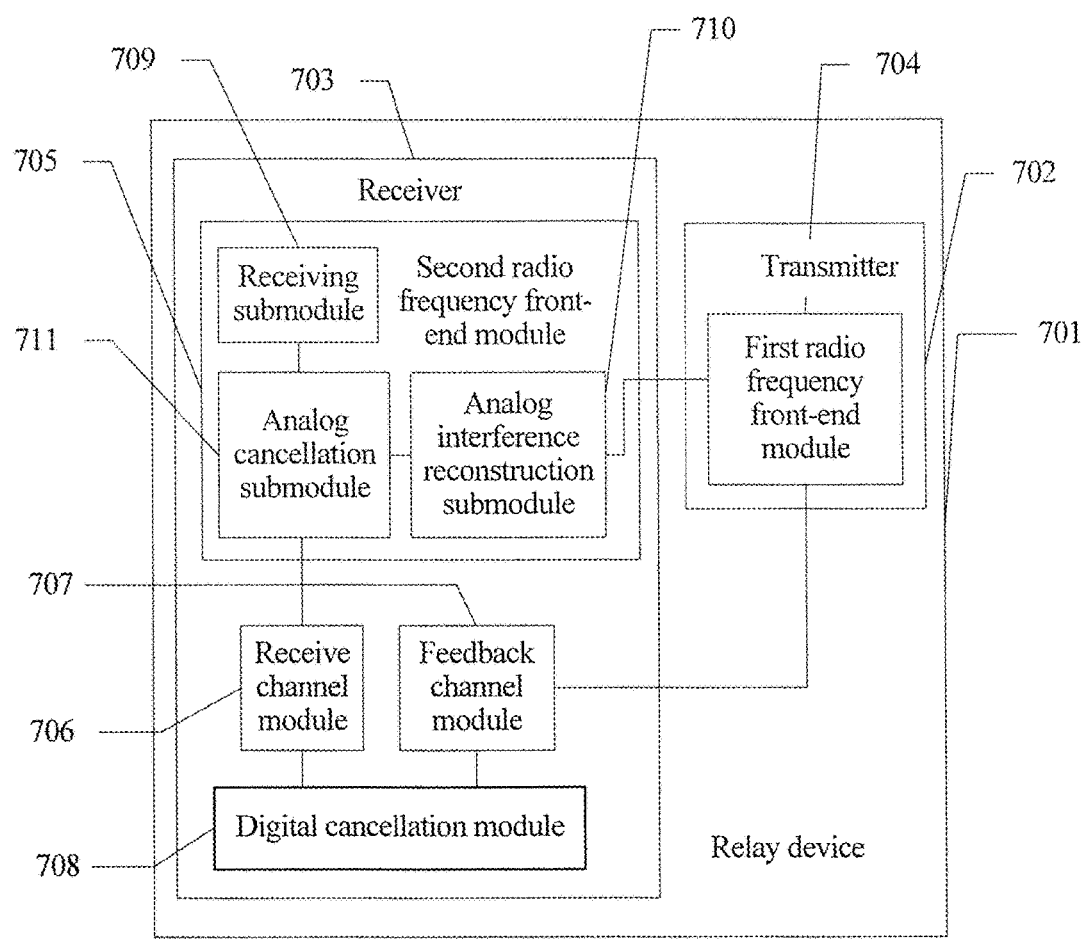
FIG. 8 is a schematic structural diagram of a relay device according to an embodiment of the present invention.

As shown in FIG. 8, a fourth embodiment of the present invention provides a relay device 701, including a transmitter 702 and a receiver 703.

The transmitter 702 includes:
a first radio frequency front-end module 704, connected to a feedback channel module 707 of the receiver 703, and configured to transmit a first analog signal to the feedback channel module 707, where the first analog signal is a signal transmitted by the transmitter 702 to the outside, and the signal transmitted by the transmitter 702 to the outside forms a self-interference signal at an antenna of the receiver 703; further connected to the second radio frequency front-end module 705, and configured to send the first analog signal to the second radio frequency front-end module 705.

The receiver 703 includes:
the second radio frequency front-end module 705, configured to receive a second analog signal, where the second analog signal includes a wanted signal and the self-interference signal, and transmit the second analog signal to a receive channel module 706;

the receive channel module 706, connected to the second radio frequency front-end module 705, and configured to receive the second analog signal transmitted by the second radio frequency front-end module 705, perform analog-to-digital conversion on the second analog signal so as to obtain a second digital signal, and transmit the second digital signal to a digital cancellation module 708, where the second digital signal includes a wanted signal component and a self-interference signal component;

the feedback channel module 707, connected to the first radio frequency front-end module 704, and configured to receive the first analog signal transmitted by the first radio frequency front-end module 704, perform analog-to-digital conversion on the first analog signal so as to obtain a first digital signal, and transmit the first digital signal to the digital cancellation module 708; and the digital cancellation module 708, separately connected to the receive channel module 706 and the feedback channel module 707, and configured to receive the second digital signal transmitted by the receive channel module 706 and the first digital signal transmitted by the feedback channel module 707, and perform digital cancellation on the second digital signal and the first digital signal so as to eliminate a self-interference component of the second digital signal.

The second radio frequency front-end module 705 further includes:

a receiving submodule 709, configured to receive the second analog signal, and transmit the second analog signal to an analog cancellation submodule 711;

an analog interference reconstruction submodule 710, connected to the first radio frequency front-end module 704, and configured to receive the first analog signal sent by the first radio frequency front-end module 704, perform analog interference reconstruction on the first analog signal so as to obtain a self-interference analog cancellation signal, and transmit the self-interference analog cancellation signal to the analog cancellation submodule 711;

the analog cancellation submodule 711, separately connected to the receiving submodule 709 and the reconstruction submodule 710, and configured to receive the second analog signal transmitted by the receiving submodule 709, receive the self-interference analog cancellation signal transmitted by the reconstruction module, and perform analog cancellation on the second analog signal and the self-interference analog cancellation signal so as to obtain a second analog signal after the analog cancellation; and transmit the second analog signal obtained after the analog cancellation to the receive channel module 706; where the receive channel module 706 is connected to the analog cancellation submodule 711, and is configured to receive the second analog signal that is obtained after the analog cancellation and sent by the analog cancellation submodule 711, and perform analog-to-digital conversion on the second analog signal obtained after the analog cancellation, so as to obtain the second digital signal, where the second digital signal includes the wanted signal component and the self-interference signal component.

Optionally, the digital cancellation module 708 is specifically configured to: perform digital interference reconstruction according to the first digital signal so as to obtain a self-interference digital cancellation signal, combine the self-interference digital cancellation signal with the second digital signal, and complete digital cancellation so as to eliminate the self-interference signal component of the second digital signal, thereby obtaining the wanted signal component.

Optionally, the digital cancellation module 708 is further configured to: perform digital filtering on the first digital signal after receiving the first digital signal transmitted by the receive channel module 706, and perform digital cancellation on the second digital signal and the first digital signal after performing the digital filtering on the first digital signal, so as to obtain a wanted digital signal of the second digital signal.

Optionally, the second radio frequency front-end module 705 is configured to receive the second analog signal in a superheterodyne manner.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The method for reducing adjacent-channel interference and the relay device that are provided in the embodiments of the present invention are described in detail above. With respect to the specific implementation manners and the application scope, modifications may be made by a person of ordinary skill in the art according to the idea of the embodiments of the present invention. Therefore, the content of this specification shall not be construed as a limitation on the present invention.

What is claimed is:

1. A relay device, comprising:
a transmitter comprising a first radio frequency front-end module; and
a receiver comprising a second radio frequency front-end module, a receive channel module, a feedback channel module, and a digital cancellation module, wherein:
the first radio frequency front-end module is connected to the feedback channel module of the receiver, and is configured to transmit a first analog signal to the feedback channel module, wherein the first analog signal is a signal transmitted by the transmitter to the outside, and the signal transmitted by the transmitter to the outside forms a self-interference signal at an antenna of the receiver,
the second radio frequency front-end module is configured to receive a second analog signal, wherein the second analog signal comprises a wanted signal and the self-interference signal, and transmit the second analog signal to the receive channel module,
the receive channel module is connected to the second radio frequency front-end module, and is configured to receive the second analog signal transmitted by the second radio frequency front-end module, perform analog-to-digital conversion on the second analog signal to obtain a second digital signal, and transmit the second digital signal to the digital cancellation module, wherein the second digital signal comprises a wanted signal component and a self-interference signal component,
the feedback channel module is connected to the first radio frequency front-end module, and is configured to receive the first analog signal transmitted by the first radio frequency front-end module, perform pre-processing and analog-to-digital conversion on the first analog signal to obtain a first digital signal, and transmit the first digital signal to the digital cancellation module, and
the digital cancellation module is separately connected to the receive channel module and the feedback channel module, and is configured to receive the second digital signal transmitted by the receive channel module and the first digital signal transmitted by the feedback channel module, and perform digital cancellation on the second digital signal and the first digital signal to eliminate a self-interference component of the second digital signal.

2. The relay device according to claim 1, wherein the digital cancellation module is configured to:
perform digital interference reconstruction according to the first digital signal to obtain a self-interference digital cancellation signal, and combine the self-interference digital cancellation signal with the second digital signal.

3. The relay device according to claim 1, wherein the digital cancellation module is further configured to:
perform digital filtering on the first digital signal after receiving the first digital signal transmitted by the receive channel module, to obtain a first digital signal after the digital filtering; and
perform digital cancellation on the second digital signal and the first digital signal obtained after the digital filtering.

4. The relay device according to claim 1, wherein the second radio frequency front-end module is configured to receive the second analog signal in a superheterodyne manner.

5. A relay device, comprising:
a transmitter comprising a first radio frequency front-end module; and
a receiver comprising a second radio frequency front-end module, a receive channel module, a feedback channel module, and a digital cancellation module, wherein:
the first radio frequency front-end module is connected to the feedback channel module of the receiver, and is configured to transmit a first analog signal to the feedback channel module, wherein the first analog signal is a signal transmitted by the transmitter to the outside, and the signal transmitted by the transmitter to the outside forms a self-interference signal at an antenna of the receiver, and wherein the first radio frequency front-end module is further connected to the second radio frequency front-end module, and is configured to send the first analog signal to the second radio frequency front-end module,
the second radio frequency front-end module is configured to receive a second analog signal, wherein the second analog signal comprises a wanted signal and the self-interference signal, and transmit the second analog signal to the receive channel module, and wherein the second radio frequency front-end module further comprises:
a receiving submodule, configured to receive the second analog signal, and transmit the second analog signal to an analog cancellation submodule, and
a reconstruction submodule, connected to the first radio frequency front-end module, and configured to receive the first analog signal sent by the first radio frequency front-end module, perform analog interference reconstruction according to the first analog signal to obtain a self-interference analog cancellation signal, and transmit the self-interference analog cancellation signal to the analog cancellation submodule,
wherein the analog cancellation submodule is separately connected to the receiving submodule and the reconstruction submodule, and configured to receive the second analog signal transmitted by the receiving submodule, receive the self-interference analog cancellation signal transmitted by the reconstruction submodule, and perform analog cancellation on the second analog signal and the self-interference analog cancellation signal to obtain a second analog signal after the analog cancellation; and transmit the second analog signal obtained after the analog cancellation to the receive channel module,
wherein the receive channel module is connected to the second radio frequency front-end module, and is configured to receive the second analog signal transmitted by the second radio frequency front-end module, perform analog-to-digital conversion on the second analog signal to obtain a second digital signal, and transmit the second digital signal to the digital cancellation module, wherein the second digital signal comprises a wanted signal component and a self-interference signal component, wherein the receive channel module is connected to the analog cancellation submodule, and is configured to receive the second analog signal that is obtained after the analog cancellation and sent by the analog cancellation submodule, and perform analog-to-digital conversion on the second analog signal obtained after the analog cancellation, to obtain the second digital signal,
wherein the feedback channel module is connected to the first radio frequency front-end module, and is configured to receive the first analog signal transmitted by the first radio frequency front-end module, perform preprocessing and analog-to-digital conversion on the first analog signal to obtain a first digital signal, and transmit the first digital signal to the digital cancellation module, and
wherein the digital cancellation module is separately connected to the receive channel module and the feedback channel module, and is configured to receive the second digital signal transmitted by the receive channel module and the first digital signal transmitted by the feedback channel module, and perform digital cancellation on the second digital signal and the first digital signal to eliminate a self-interference component of the second digital signal.

6. A method for reducing adjacent-channel interference, the method comprising:
obtaining, by a receiver, a first analog signal from a radio frequency front-end of a transmitter, wherein the receiver and the transmitter are disposed in a relay device, the first analog signal is a signal transmitted by the transmitter to the outside, and the signal transmitted by the transmitter to the outside forms a self-interference signal at an antenna of the receiver;
performing preprocessing and analog-to-digital conversion on the first analog signal to obtain a first digital signal;
performing digital filtering on the first digital signal to obtain a filtered first digital signal;
receiving, by the receiver, a second analog signal, wherein the second analog signal comprises a wanted signal and the self-interference signal;
performing analog-to-digital conversion on the second analog signal to obtain a second digital signal, wherein the second digital signal comprises a wanted signal component and a self-interference signal component; and
performing digital cancellation on the second digital signal and the filtered first digital signal to eliminate a self-interference component of the second digital signal, including performing digital interference reconstruction according to the first digital signal to obtain a self-interference digital cancellation signal, and combining the self-interference digital cancellation signal with the second digital signal.

7. A method for reducing adjacent-channel interference, the method comprising:
obtaining, by a receiver, a first analog signal from a radio frequency front-end of a transmitter, wherein the receiver and the transmitter are disposed in a relay device, the first analog signal is a signal transmitted by the transmitter to the outside, and the signal transmitted by the transmitter to the outside forms a self-interference signal at an antenna of the receiver;

performing analog interference reconstruction according to the first analog signal to obtain a self-interference analog cancellation signal;

performing preprocessing and analog-to-digital conversion on the first analog signal to obtain a first digital signal;

receiving, by the receiver, a second analog signal, wherein the second analog signal comprises a wanted signal and the self-interference signal;

performing analog cancellation on the second analog signal and the self-interference analog cancellation signal to obtain a second analog signal after the analog cancellation;

performing analog-to-digital conversion on the second analog signal to obtain a second digital signal by performing analog-to-digital conversion on the second analog signal obtained after the analog cancellation, to obtain the second digital signal, wherein the second digital signal comprises a wanted signal component and a self-interference signal component; and performing digital cancellation on the second digital signal and the first digital signal to eliminate a self-interference component of the second digital signal.

8. The method for reducing adjacent-channel interference according to claim 6, wherein receiving, by the receiver, a second analog signal comprises:

receiving, by the receiver, the second analog signal in a superheterodyne manner, wherein the receiver is a superheterodyne receiver.

\* \* \* \* \*